US009836445B2

(12) United States Patent
Nazem et al.

(10) Patent No.: US 9,836,445 B2
(45) Date of Patent: Dec. 5, 2017

(54) DYNAMIC PAGE GENERATOR

(75) Inventors: Farzad Nazem, Redwood City, CA (US); Ashvinkumar P. Patel, Milpitas, CA (US)

(73) Assignee: EXCALIBUR IP, LLC, New York, NY (US)

( * ) Notice: Subject to any disclaimer, the term of this patent is extended or adjusted under 35 U.S.C. 154(b) by 1268 days.

(21) Appl. No.: 11/933,135

(22) Filed: Oct. 31, 2007

(65) Prior Publication Data
US 2008/0046826 A1 Feb. 21, 2008

Related U.S. Application Data

(63) Continuation of application No. 11/842,095, filed on Aug. 20, 2007, which is a continuation of application
(Continued)

(51) Int. Cl.
*G06F 17/00* (2006.01)
*G06F 17/24* (2006.01)
(Continued)

(52) U.S. Cl.
CPC ........ *G06F 17/248* (2013.01); *G06F 17/2247* (2013.01); *G06F 17/2288* (2013.01);
(Continued)

(58) Field of Classification Search
CPC .... G06F 17/2247; G06F 17/24; G06F 17/248; G06F 17/2288; G06F 17/3087; G06F 17/30893
(Continued)

(56) References Cited

U.S. PATENT DOCUMENTS 5,546,455 A    8/1996   Joyce et al.
5,740,430 A * 4/1998   Rosenberg ........ G06F 17/30887
(Continued)

FOREIGN PATENT DOCUMENTS

EP        0749081     12/1996
WO    WO9717662    5/1997

OTHER PUBLICATIONS

Chesnais, P. R. et al. "The Fishwrap Personalized News System," IEEE Proceedings of the Second International Workshop on Community Networking, ( Jun. 1995) pp. 275-282.
(Continued)

*Primary Examiner* — Cesar Paula
*Assistant Examiner* — David Faber
(74) *Attorney, Agent, or Firm* — James J. DeCarlo; Greenberg Traurig, LLP

(57) ABSTRACT

An custom page server is provided with user preferences organized into templates stored in compact data structures and the live data used to fill the templates stored local to the page server which is handing user requests for custom pages. One process is executed on the page server for every request. The process is provided a user template for the user making the request, where the user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM
(Continued)

(random access memory) and disk storage, in many computer systems, it is faster to store all the live data in RAM.

11 Claims, 8 Drawing Sheets

Related U.S. Application Data

No. 11/656,636, filed on Jan. 22, 2007, now Pat. No. 7,565,359, which is a continuation of application No. 09/393,718, filed on Sep. 10, 1999, now Pat. No. 7,171,414, which is a continuation of application No. 08/873,975, filed on Jun. 12, 1997, now Pat. No. 5,983,227.

(51) Int. Cl.
| | |
|---|---|
| *G06F 17/22* | (2006.01) |
| *G06F 17/30* | (2006.01) |
| *G06Q 30/02* | (2012.01) |
| *H04W 4/02* | (2009.01) |
| *H04L 29/08* | (2006.01) |

(52) U.S. Cl.
CPC .......... *G06F 17/24* (2013.01); *G06F 17/3087* (2013.01); *G06F 17/30893* (2013.01); *G06Q 30/02* (2013.01); *H04L 67/18* (2013.01); *H04W 4/02* (2013.01); *Y10S 707/99933* (2013.01); *Y10S 707/99945* (2013.01)

(58) Field of Classification Search
USPC ............... 715/200, 201, 234, 255, 744–745
See application file for complete search history.

(56) References Cited

U.S. PATENT DOCUMENTS

| | | | |
|---|---|---|---|
| 5,754,938 A | 5/1998 | Herz et al. | |
| 5,754,939 A | 5/1998 | Herz et al. | |
| 5,761,662 A | 6/1998 | Dasan | |
| 5,793,497 A | 8/1998 | Funk | |
| 5,793,972 A | 8/1998 | Shane | |
| 5,796,952 A | 8/1998 | Davis et al. | |
| 5,835,087 A | 11/1998 | Herz et al. | |
| 5,835,712 A | 11/1998 | DuFresne | |
| 5,848,396 A | 12/1998 | Gerace | |
| 5,867,665 A | 2/1999 | Butman et al. | |
| 5,895,476 A * | 4/1999 | Orr | G06F 17/211 715/202 |
| 5,897,622 A | 4/1999 | Blinn et al. | |
| 5,903,902 A * | 5/1999 | Orr | G06F 17/211 715/202 |
| 5,913,029 A | 6/1999 | Shostak | |
| 5,913,033 A * | 6/1999 | Grout | G06F 17/30902 707/E17.12 |
| 5,918,214 A | 6/1999 | Perkowski | |
| 5,933,599 A | 8/1999 | Nolan | |
| 5,935,207 A * | 8/1999 | Logue et al. | 709/219 |
| 5,960,432 A * | 9/1999 | Werner | G06F 9/4446 |
| 5,974,508 A * | 10/1999 | Maheshwari | 711/133 |
| 5,983,227 A | 11/1999 | Nazem et al. | |
| 5,987,480 A * | 11/1999 | Donohue | G06Q 30/02 715/207 |
| 6,026,433 A * | 2/2000 | D'Arlach | G06F 17/24 707/999.01 |
| 6,061,695 A * | 5/2000 | Slivka | G06F 17/2241 345/629 |
| 6,128,663 A * | 10/2000 | Thomas | G06Q 30/02 709/217 |
| 6,226,654 B1 | 5/2001 | Van Hoff | |
| 6,327,599 B1 | 12/2001 | Warmus et al. | |
| 6,330,592 B1 | 12/2001 | Makuch et al. | |
| 6,338,085 B1 | 1/2002 | Ramaswamy | |
| 6,412,008 B1 | 6/2002 | Fields et al. | |
| 6,415,307 B2 | 7/2002 | Jones et al. | |
| 6,539,232 B2 | 3/2003 | Hendrey et al. | |
| 6,542,748 B2 | 4/2003 | Hendrey et al. | |
| 6,542,749 B2 | 4/2003 | Tanaka et al. | |
| 6,542,750 B2 | 4/2003 | Hendrey et al. | |
| 6,647,269 B2 | 11/2003 | Hendrey et al. | |
| 6,819,919 B1 | 11/2004 | Tanaka | |
| 6,832,226 B1 | 12/2004 | Parker | |
| 7,171,414 B1 | 1/2007 | Nazem et al. | |
| 7,424,471 B2 | 9/2008 | Ross | |
| 7,813,741 B2 | 10/2010 | Hendrey et al. | |
| 2001/0047373 A1 | 11/2001 | Jones et al. | |
| 2007/0118796 A1 | 5/2007 | Nazem et al. | |

OTHER PUBLICATIONS

Garris, J. "Grab That Database," PC Magazine vol. 15 No.(15), (Sep. 10, 1996). 7 pages.
Quintana, Y. "Knowledge-Based Information Filtering of Financial Information," Proceeding of the National Online Meeting, XP-002057953 (May 1997); pp. 279-285.
U.S. Appl. No. 11/842,095, filed Aug. 20, 2007 for Nazem et al.

\* cited by examiner

```
<html>
<head>
<title>My Yahoo! news summary for <!-- login --></title>
</head>
<body>

<center>
<!--banner:sum -->

<!-- ad -->
<!-- nav bar -->                302
</center>

<table border=1 cellpadding=4 cellspacing=0 width=100%">
<tr><td align=center valign=top width="1%">
<!-- leftside:nsum -->          302

<p></td>
<td align=center valign=top width="100%">
<!-- mode bar:"FRONT PAGE" -->
<!-- channel:nsum -->           302

</td></tr>
</table>

<center>
<table border=1 cellpadding=2 cellspacing=0 width=100%">
<!-- motd:motn.html -->
</table>
</center>
<!-- search -->

<!-- copyright:sum -->

</body>
</html>
```

```
<!-- timezone:-8,PT 0 -->
<!-- ad:M,85,95035,T,* 792 -->
<!-- portfolio:Quotes,pf_1,1,^DJI,^NYA,^IXIC,^SPX,^XAX,YHOO,NSCP,IOM,NSCP,YHOO 2836 -->
<!--
scoreboard:NCAAFSSC,NHLSAN,MLSSAN,NCAAFSSS,ALOAK,NBAGSW,NFLOAK,NCAAFCCD,NFLSFO,NLSFO 3803 -->
<!-- weather:f,30901,uk_londo,94601,95101 4368 -->
<!--
mode_bar:"FRONT_PAGE",.hier=News+Summary%3aEdit&.done=http://my.yahoo.com/news/summary2:3,rt,rw,z0000,mlb,re,vf 4597 -->
<!-- motd:us_motn.html 4696 -->
<html>
<head>
<title>My Yahoo! news summary for ash802</title>
</head>
<body>
...
</body>
</html>
```

*FIG. 4*

MY NEWS  MY  MY CONTACTS
        WEB

My Yahoo!
NEWS

HELP  EDIT  PREFER-  MY AGENT
            ENCES 508, 508, 508, 508

SEARCH  OPTIONS

SECTIONS: FRONT PAGE | BUSINESS | PORTFOLIOS | ENTERTAINMENT | SPORTS | TECHNOLOGY 502, 502, 512

[MOVE TO BOTTOM]

| PORTFOLIOS | | | EDIT |
|---|---|---|---|
| QUOTES | | | |
| DJIA | 7312.15 | +22.75 | |
| NYSE | 442.36 | +0.82 | |
| NASDAQ | 1384.91 | -19.88 | |
| S&P 500 | 845.48 | -0.88 | |
| AMEX | 609.02 | +1.85 | |
| * YHOO | 32 1/2 | -5/8 | |
| * NSCP | 29 1/4 | -5/8 | |
| * IOM | 19 1/4 | +1/2 | |
| * NSCP | 29 1/4 | -5/8 | |
| * YAHOO | 32 1/4 | -5/8 | |

GET QUOTES

QUOTES DELAYED 20 MINUTES-DISCLAIMER+
CLICK ON SYMBOL FOR DETAILED QUOTE+
NEWS. *NEW NEWS DURING LAST 24 HRS.

SCOREBOARD
TODAY    EDIT

504

| FRONT PAGE JUN 3  7:40 PM | EDIT TOPICS |
|---|---|
| BREAKING NEWS *JUN 3 5:03 PM* | |
| • JUDGE MOVES TO AVOID McVEIGH 'LYNCHING' | |
| • McVEIGHS EXPECTED APPEALS MAY LAST YEARS | |
| • EXPERTS: PLEA FOR MERCY IS McVEIGH'S BEST HOPE | |
| WORLD *JUN 3 2:09 PM* | |
| • CANADIAN LIBERALS FACE THORNY ISSUES | |
| • U.S. ADVOCATES READY FOR NATO EXPANSION FIGHT | |
| • U.S. FERRIES MORE FOREIGNERS FROM SIERRA LEONE | |
| U.S. STOCK NEWS AND REPORT | |
| • CARDIMA INC IPO RANGE REDUCED – UNDERWRITER | |
| • AMEX TO TRADE LEUCADIA, WEST TELESERVICES OPTIONS | |
| • CBOE TO TRADE OPTIONS ON ALBERTO-CULVER CLASS A | |

DYNAMIC PAGE GENERATOR

CROSS-REFERENCE TO RELATED APPLICATIONS

This application is a continuation of U.S. application Ser. No. 11/842,095, filed Aug. 20, 2007, which is a continuation of U.S. application Ser. No. 11/656,636, filed Jan. 22, 2007, which is a continuation of U.S. application Ser. No. 09/393,718, filed Sep. 10, 1999, which is a continuation of U.S. application Ser. No. 08/873,975, filed Jun. 12, 1997. The contents of these patent applications are herein incorporated by reference in their entirety.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of customized information presentation. More specifically, one embodiment of the invention provides a custom page server which can quickly serve custom pages and is scalable to handle many users simultaneously.

Web servers for serving static documents ("Web pages") over the global Internet are known. While static documents are useful in many applications where the information to be presented to each requesting user is the same, some applications require customization to appeal to users. For example, in presenting news to users, custom pages present news which is more relevant to the requesting users than static pages. With static pages, a user will often have to scroll through many topics not of interest to that user to get to the information of interest. With custom pages, the information is filtered according to each user's interest.

Customizing a server response based on the requester is known, however known systems do not scale well. One method of serving custom pages is to execute a script, such as a CGI (Common Gateway Interface) script, or other program to collect the information necessary to generate the custom page. For example, if the custom page is a news page containing stock quotes, sports scores and weather, the script might poll a quote server to obtain the quotes of interest, poll a sports score server to obtain the scores of interest and poll a weather server to obtain the weather. With this information, the server generates the custom page and returns it to the user. This approach is useful where there are not many requesters and where the attendant delay is acceptable to users. While it may be the case that current users are willing to wait while pages load in their browsers, growing impatience with waiting will turn users away from such servers, especially as use increases.

One approach to avoiding long waits is to transfer the custom information in non-real-time, so that the information is stored local to the user as it arrives and is presented to the user on request. A disadvantage of such a system is that the networks used by the user become clogged with data continually streaming to the user and require large amounts of local storage. Another disadvantage is that the locally stored information will become out of date as the server receives new data.

From the above it is seen that an improved system for delivering custom pages is needed.

SUMMARY OF THE INVENTION

An improved custom page server is provided by virtue of the present invention. In one embodiment, user preferences are organized into templates stored in compact data structures and the live data used to fill the templates is stored local to the page server which is handing user requests for custom pages. One process is executed on the page server for every request. The process is provided a user template for the user making the request, where the user template is either generated from user preferences or retrieved from a cache of recently used user templates. Each user process is provided access to a large region of shared memory which contains all of the live data needed to fill any user template. Typically, the pages served are news pages, giving the user a custom selection of stock quotes, news headlines, sports scores, weather, and the like. With the live data stored in a local, shared memory, any custom page can be built within the page server, eliminating the need to make requests from other servers for portions of the live data. While the shared memory might include RAM (random access memory) and disk storage, in many computer systems, it is faster to store all the live data in RAM.

If the volume of requests becomes too great for one page server to handle, the system is easily scaled by adding additional page servers. Each page server maintains its own copy of the live data in its shared memory, and needs to maintain only the user templates for the requests it is handling, so no communication between page servers is needed.

A further understanding of the nature and advantages of the inventions herein may be realized by reference to the remaining portions of the specification and the attached drawings.

BRIEF DESCRIPTION OF THE DRAWINGS

FIG. 3 is an illustration of a global front page template as might be used to generate user templates.

FIG. 4 is an illustration of a user template generated from the global front page template of FIG. 3 as might be used to generate a custom user page.

Two appendices are included at the end of this description. Appendix A is a full listing of the user template shown in part in FIG. 4. Appendix B is an HTML source code listing of the HTML page used to generate the browser display shown in FIG. 5.

DESCRIPTION OF THE PREFERRED EMBODIMENTS

Figure 1:
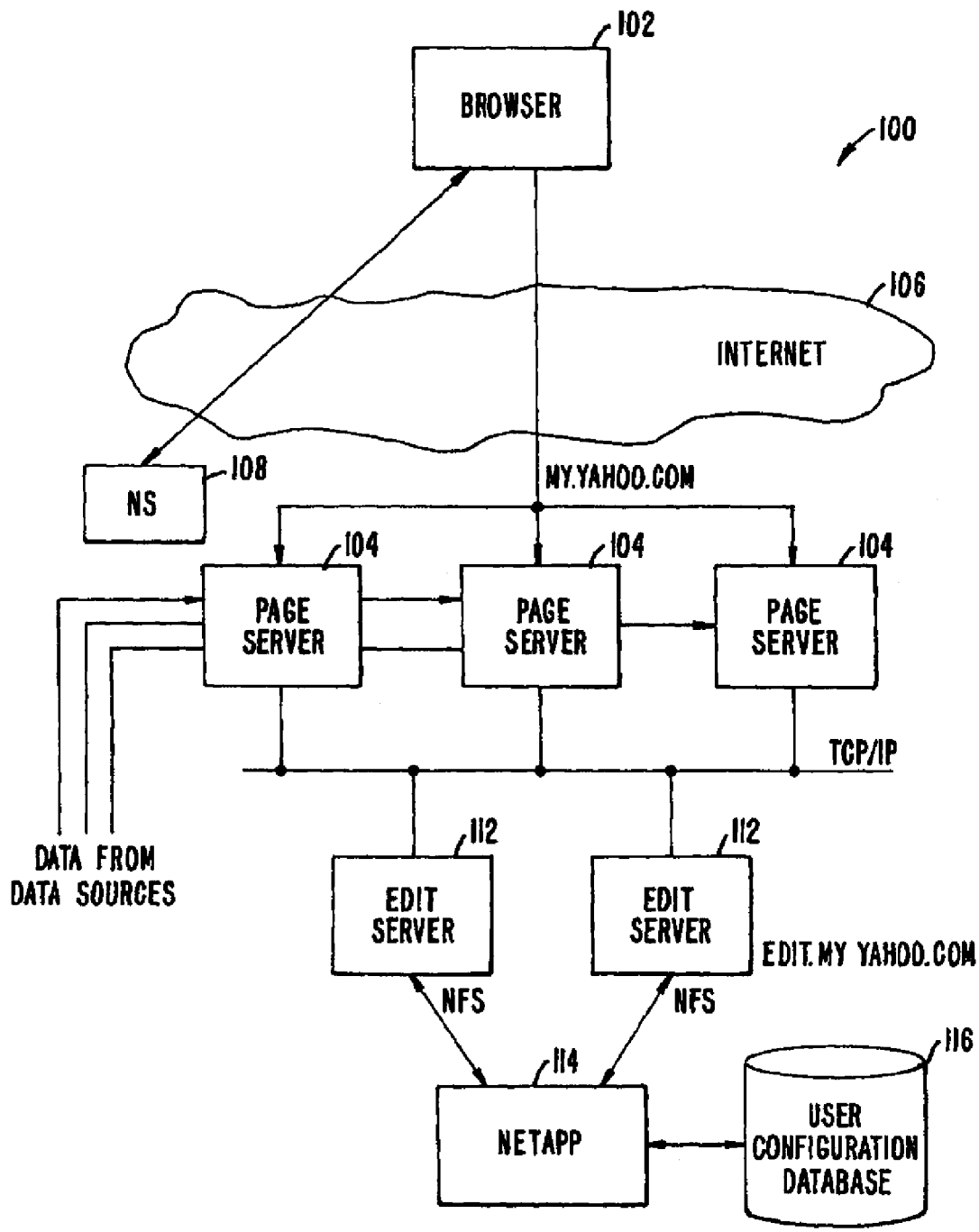
FIG. 1 is a block diagram of a client-server architecture according to one embodiment of the present invention.

FIG. 1 shows a client-server system 100 which is used to display custom news pages. A custom news page is displayed on a browser 102 which obtains the page from a page server 104 via Internet 106. While only one browser 102 is shown, a typical system will have many browsers connecting and disconnecting to the system.

The art of client-server systems using HTTP (HyperText Transport Protocol) messaging or other protocols is well known and will not be addressed in detail here. Essentially, browser 102 makes a request for a particular page by specifying a Uniform Resource Locator ("URL") for the page. In the example shown in FIG. 1, the request is directed to the URL "http:/my.yahoo.com/". Normally, this URL is directed to the root directory of a machine named my.yahoo.com. As is the convention in Internet communications, browser 102 submits the domain portion ("my.yahoo.com") of the URL to a name server, such as name server 108, to determine an actual address for the page server 104. Name server 108 returns an IP (Internet Protocol) address to browser 102 directing it to a page server 104. Where multiple page servers 104 are used, name server 108 returns IP addresses in a round-robin fashion to distribute the load over multiple page servers. Alternatively, name server 108 might distribute the load more deterministic by tracking browser addresses and hashing the browser address to select a page server 104. It is deterministic in that any given browser always accesses the same page server 104. This allows for more efficient caching of user templates, since more cache hits are likely where a given browser always returns to one page server.

When a page server receives the URL for its root directory, it interprets that as a request for the user's custom summary page. The user is determined not from the URL, but from a "cookie" provided by browser 102 with the URL. Cookies are strings of data stored by browsers and sent along with any request to a URL having a domain associated with the cookie.

Page servers 104 obtain the live data from many disparate sources and reformat the data into a form suitable for use by the page server. Page servers 104 are coupled, via a network, to edit servers 112, which are used when a user changes his or her user template. The user templates are stored in a user configuration database 116 and are stored and provided to edit servers by a network appliance 114 written for this purpose. Network appliance 114 is a process tuned to quickly locate files in large directories (N4OO files/directory) and return them to the edit servers or page servers. One embodiment of network appliance 114 is the F330 fault-tolerant scalable server supplied by Network Appliance, of Mountain View, Calif. In a specific embodiment, page servers 104 are microcomputers running the nix@ operating system with 64 to 128 megabytes of shared memory, page servers 104 and edit servers 112 are coupled using TCP/IP (Transport Control Protocol/Internet Protocol) and the user configuration database 116 is a Unix file structure which stores each user configuration in a text file. The particular file used by a user is a combination of the user's user name and a hash result, to allow for quick access when many user configurations are stored. For example, the user configuration for summary "front" page for a user "ash802" might be stored at /de/13/y.ash802, where "de" and "13" are hash results of a hash of the user name "ash802".

Figure 2:
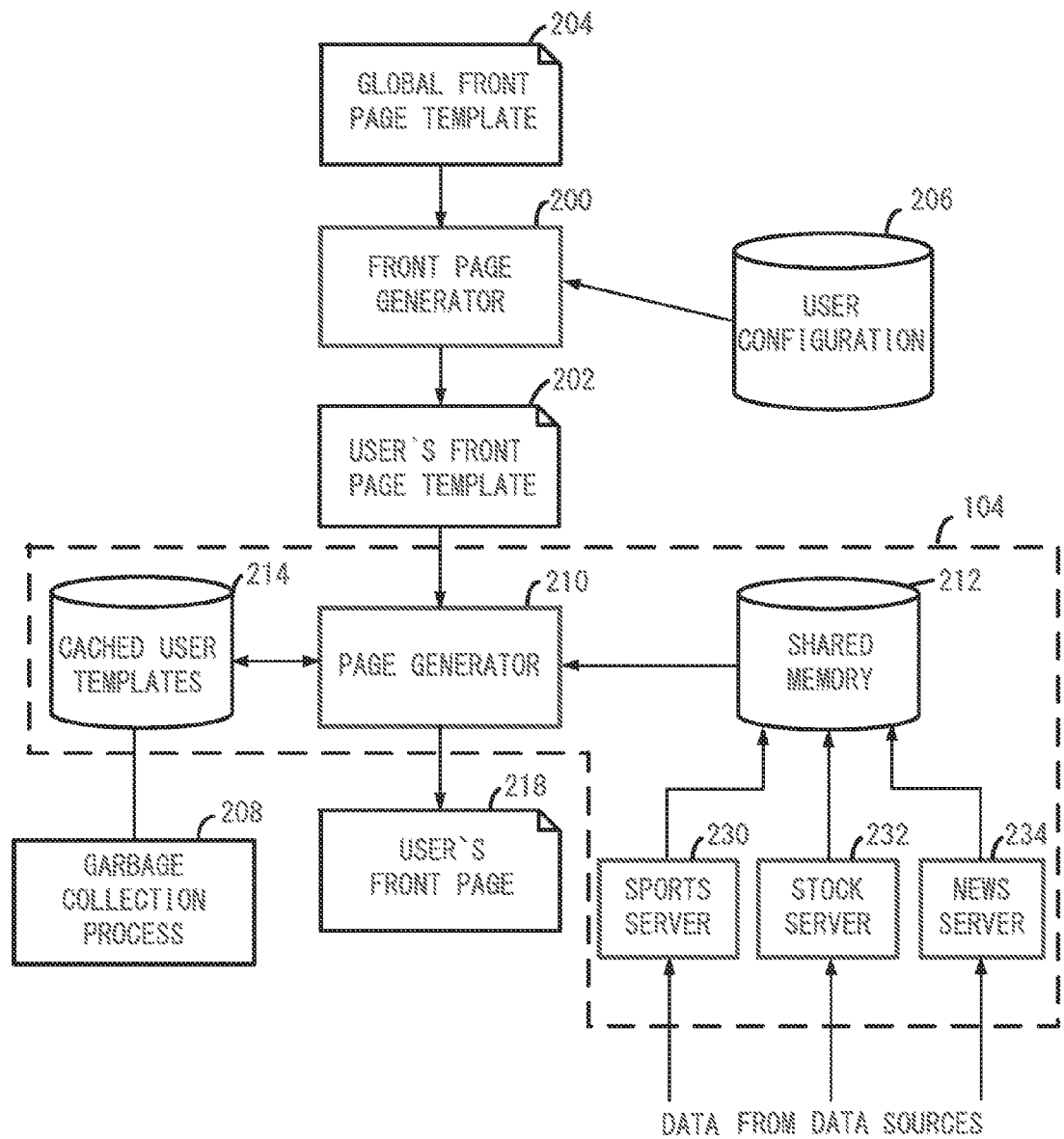
FIG. 2 is a schematic diagram showing how a user's custom page is generated from a user configuration, a global template and live data.

FIG. 2 shows in more detail the generation of a custom page for a user, using a front page generator 200 and page server 104. Front page generator 200 generates a user template 202 from a global front page template 204 and a user configuration record 206. FIG. 3 shows an example of a global front page template. User configuration record 206 is a record selected from user configuration database 116. The record might have been obtained from a cache, but in the preferred embodiment, the records are not cached, the user templates are.

Page server 104 is shown comprising a page generator 210, a shared memory 212 for storing live data and a cache 214 for caching user templates such as user template 202. Page generator 210 generates a custom front page 218 from a user template and the live data stored in shared memory 212. Although not shown, custom pages other than the front page can be generated in a similar fashion. Using user templates and a shared memory for the live data, page server 104 can quickly build custom pages in response to a user request. Where the user template is cached, the page can be generated entirely within page server 104.

Shared memory 212 is organized as a set of memory mapped files. With memory mapped files, the operating system maintains the data in permanent storage, but permanently caches the files in shared memory 212. This allows for quick recovery should a page server crash, since all of the shared memory can simply be reloaded from the permanent storage. This is a great feature from a user convenience standpoint, since the user will never be faced with a situation where they have to wait for a server to rebuild a page for them by querying the various data providing servers, such as sports server 230, stock server 232 and news server 234. As should be apparent from this description and FIG. 2, page generator 210 can generate custom front page 218 much more quickly using shared memory 212 as compared with using servers 230, 232, 234 and page template 202. One reason for this is that the time it takes to retrieve data from shared memory 212—does not appreciably increase relative to the bandwidth delay time when more data is retrieved. For example, if stock server 232 were queried for each individual stock quote, a page with fifty stock quotes might take ten times as long to generate as a page with five stock quotes.

One aspect of the present invention is the realization that every piece of information a person can request on a page is storable in a shared memory closely coupled to a page generator. For example, page server 104 shown in FIG. 2 can accommodate 65,000 different symbols for which quotes are provided. In one embodiment, all of the stock information for all 65,000 symbols is stored in a 13 to 14 megabytes section of the shared memory. Where shared memory 212 is a 64 MB or 128 MB memory, this leaves sufficient room for other data, such as news headlines, sport scores, and memory used by the operating system for each process running on page server 104. In some embodiments, shared memory 212 is large enough to also accommodate more than just news headlines. For example, news summaries (as described further in connection with FIG. 5) can be stored in shared memory 212 for quick access.

Figure 7:
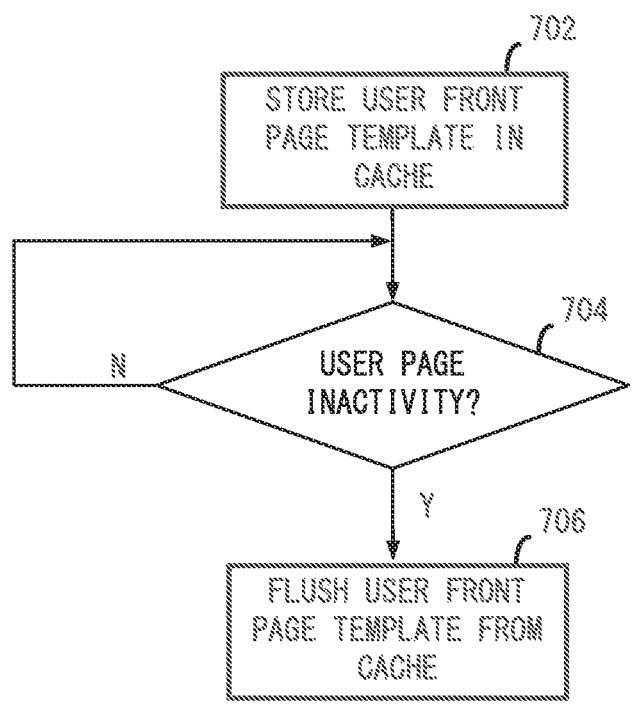
FIG. 7 provides for flushing a user front page template stored in cache due to user page inactivity in accordance with at least one embodiment.

As shown in FIG. 2, the user's front page template 202 does not need to be generated each time, but rather is stored in cache 214, as illustrated, for example, by element 702 of FIG. 7, In a preferred embodiment, user templates are stored in cache 214 for long enough to be reused. Some users might choose to access their front page only infrequently, while others might choose to access their front page hourly. Since the pages are customized and dynamic, the user would see different information each time, but the same user template would be used each time. Of course, when the user edits his or her template, any cached copy of a user template is flushed. A garbage-collection process 208 may also flush the cache of user pages which have been inactive for several days, as illustrated, for example, by elements 704 and 706 of FIG. 7. In one implementation, cache 214 would accommodate 60,000 to 70,000 user templates. Where a particular page server is assigned on a random round robin basis, multiple page servers may cache their own copy of a given user template, but where a user is directed always to a particular server (except in the case where the particular server fails and a secondary server is used), that page server will be the only one which needs to cache that users user template. Even where the round robin name server scheme is used, some browsers may cache IP addresses, even longer than the specified "time to live" variable associated with the IP address, in order to save the time required to obtain an IP address each time. With such a browser, the user is effectively directed to the same page server each time and the server side of the page serving system does not need to direct users to particular page servers. With newer browsers, however, the "time to live" variable is honored and new requests are made for IP addresses after the "time to live" has expired. In these cases, if the assignment of a user to a single page server is desired, name server 108 (see FIG. 1) will use the user name from the provided cookie or the user's IP address to assign a page server based on a hash of the user name or IP address.

FIG. 3 is an illustration of global user template 204. Global user template 204 is an HTML (HyperText Markup Language) document with additional tags as placeholders for live data. Several placeholders 302 are shown in FIG. 3.

FIG. 4 is an illustration of user template 202 as might be generated from global user template 204 (see FIG. 3) and a user configuration record 206. A full listing of user template 202 is included herewith in Appendix A. User template 202 is determined by the user configuration and is independent of the live data, therefore it can be cached without needing to be updated, unless the user chooses to edit the configuration information. Preferably, the user templates are cached rather than the user configuration, to save a step and reduce the time to respond to a request for the page. Caching is more effective where the typical user makes several requests in a short time span and then doesn't make any requests for a long period of time.

Essentially, user template 202 contains the information about the user which does not change until the user changes his or her preferences. Of course, the system operator could choose to make changes to how the system operates, thus requiring changes to the user preferences and user templates. User template 202 is shown comprising internal variables such as a time zone and demographic information. The demographic information, on the second line in FIG. 4 is used for selection of an advertisement which will be part of the custom page. In this example, the advertisement is targeted by the demographic information in the user template ":M,85,95035,T,*" indicating that a suitable ad should be targeted to a male user, age 85, located in zip code 95035, etc. As shown, the portfolio section contains selected stock symbols, the scoreboard section contains selected team symbols, and the weather section contains selected weather cities/zip codes.

The selections of stock quote symbols, team scores, and weather cities are set by the user. In a preferred embodiment, intelligent defaults are selected by the system prior to user selection, so that users unfamiliar with the customization process will nonetheless be able to view non empty custom pages. This is described in further detail below in connection with FIG. 6.

Figure 5:
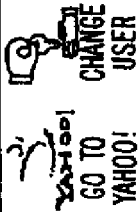
FIG. 5 is an illustration of a user page generated using the global template of FIG. 4.

FIG. 5 is an illustration of a user front page 218 returned by page server 104. User front page 218 as shown in FIG. 5 includes many elements, some of which are described here in further detail. User front page 218 is built according to a user template and live data. The user template specifies, for example which quotes are shown in the portfolio module, which cities are displayed in the weather module, etc. Each of the modules 504 can be customized by a user and moved about front page 218. The modules 504 are also reusable, in that any customized module which appears on multiple pages can be edited from any one of those pages and the edits will be reflected on each of the pages. Other custom pages for the user can be viewed by selecting one of the page buttons 502 appearing below the header. Other pages and utilities can be selected using the buttons 508 which are part of the header.

In addition to all of the live date shown in FIG. 5 being stored in the shared memory, summaries from each of the major news topics can also be stored in the shared memory and viewed by pressing on the news topic header, such as news topic header 506. As should be noted, the page generator can also intelligently display dates 510 customized for a particular user, using a time zone variable in the user template. This time zone variable is shown as the first line in user template 202 in FIG. 4. In addition to being able to modify each of the modules, in many cases the order of appearance of the modules is customizable. For example, the order of the various sections of user template 202 shown in FIG. 4 is not fixed.

The preference editing process can be initiated by the user pressing the appropriate edit button 512. As explained above, once the editing process is complete, the user template is flushed from the cache and regenerated. Since each of the news stories is essentially a static page linked to a headline shown in the news section, these can simply be linked to static pages on a news server.

Figure 6:
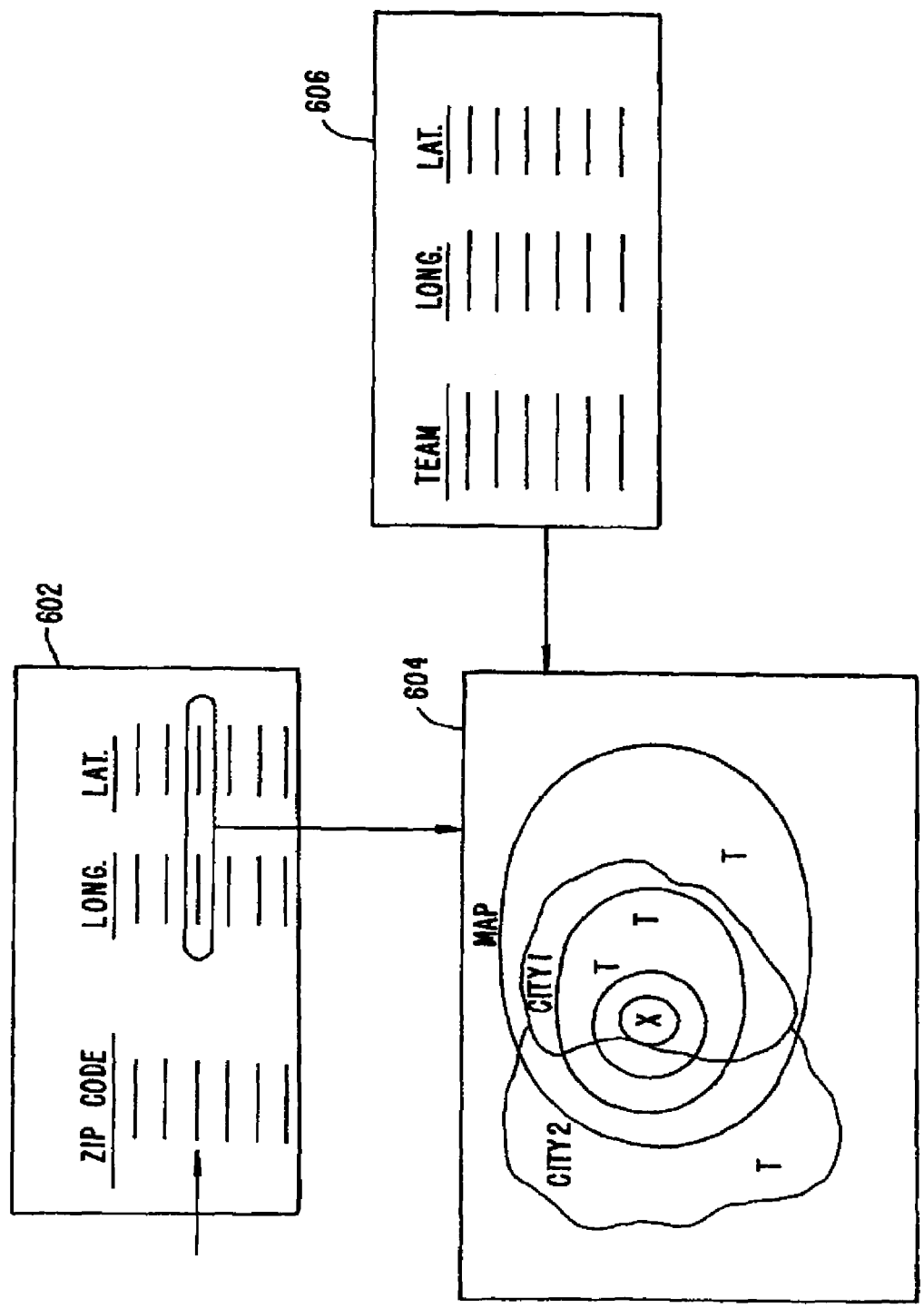
FIG. 6 is an illustration of how intelligent defaults are selected.

Referring now to FIG. 6, an illustration of intelligent defaulting for populating a user template, and consequently a user summary page. As part of a registration process, a user indicates, among other things, his or her zip code. This zip code is used to locate an approximate longitude and latitude for the user using a zip code lookup table 602. This allows the user's location to be located on a map 604. Map 604 provides city boundaries and, with team location table 606, also provides locations for various sports teams which can be selected in a sports module. In selecting a default predetermined number of cities and sports teams for inclusion as initial selections for a particular user, a circle is drawn around the user and increased in diameter until the circle envelopes a suitable predetermined number of cities and sports teams. In this way, each user is guaranteed a default number of nearby teams and cities for sports and weather, respectively. While this assumes that the user is interested in only the teams nearest the user, the system can be arranged to provide intelligent defaults where geographic anomalies are known to exist. Geographic anomalies occur in communities which have more loyalty to distant teams than nearby teams, such as might occur when the distant team is much better than the nearby team or when the nearby team recently moved to a distant location. In any case, the user is allowed customize his or her pages beginning with the intelligent defaults selected.

Other intelligent defaults can be provided in other contexts. For example, the header of user front page 218 includes a button 508 labeled "myweb" which, when pressed, would lead the user to a custom listing of web sites. The initial defaults for that custom listing of web sites might be generated based on the keywords of interest to that user or based on the news topics, sports teams or weather cities selected by the user.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method comprising:
   receiving, by at least one server computing device, a user request for at least one customized portion of a page;
   receiving, by the at least one server computing device, a template that is unique to the user and that is generated using a configuration of the page that is unique to the user and comprises at least one customization of the page that is supplied by the user, the user's unique configuration comprising the user's at least one customization of the page is used to generate the template that is unique to the user, the template, that is unique to the user and comprises information indicating the user's unique configuration of the page, is received from one of at least two locations and is flushable from a cache that is a location of the at least two locations due to infrequent usage by the user of the page having the at least one customized portion, the template is generated, before being cached, using the user's unique configuration of the page and a global template that is not unique to the user, the template, that is cached, is unique to the user, comprises information indicating the user's unique configuration of the page and is flushable from the cache;
   generating, by the at least one server computing device, the at least one customized portion of the page comprising the user's at least one customization using the template's information indicating the user's unique configuration of the page; and
   providing, by the at least one server computing device and to the user, the customized portion of the page having been generated using the template comprising information indicating the user's unique configuration of the page supplied by the user.

2. The method of claim 1, wherein the cached template is flushed from the location of the at least two locations due to infrequent usage by the user of the page having the at least one customized portion and the template is received from another location of the at least two locations.

3. The method of claim 2, the other location of the at least two locations comprising a front page generator that generates the template using the user configuration that is supplied by the user and that is unique to the user.

4. The method of claim 1, the at least one customized portion of the page comprising elements included in the customized portion of the page in accordance with the template's information indicating the user's unique configuration of the page.

5. A method comprising:
   receiving, by at least one server computing device, a user request for a customized page;
   receiving, by the at least one server computing device, a template that is unique to the user and that is generated using a user configuration of the page that is unique to the user and comprises at least one customization of the page that is supplied by the user, the user's unique configuration comprising the user's at least one customization of the page is used to generate the template that is unique to the user, the template, that is unique to the user and comprises information indicating the user's unique configuration of the page, is received from one of at least two locations and is flushable from a cache that is a location of the at least two locations due to infrequent usage by the user of the customized page, the template is generated, before being cached, using the user's unique configuration of the page and a global template that is not unique to the user, the template, that is cached, is unique to the user, comprises information indicating the user's unique configuration of the page and is flushable from the cache;
   generating, by the at least one server computing device, the customized page comprising the user's at least one customization using the template's information indicating the user's unique configuration of the page;
   determining, by the at least one server computing device, access of real-time information based on the user configuration; and
   providing, by the at least one server computing device and to the user, the customized page including the real-time information based on the determined access, the customized page comprising the real-time information having been generated using the template comprising information indicating the user's configuration of the page supplied by the user.

6. The method of claim 5 further comprising determining default real-time information based on the user configuration.

7. The method of claim 5, wherein the cached template is flushed from the location of the at least two locations due to infrequent usage by the user of the page having the at least one customized portion and the template is received from another location of the at least two locations.

8. The method of claim 7, the other location of the at least two locations comprising a front page generator that generates the template using the user configuration that is supplied by the user and that is unique to the user.

9. A method comprising:
   receiving, by at least one server computing device, a user request for at least one customized portion of a page;
   receiving, by the at least one server computing device, a template that is unique to the user and that is generated using a user configuration of the page that is unique to the user and comprises at least one customization of the page that is supplied by the user, the user's unique configuration comprising the user's at least one customization of the page is used to generate the template that is unique to the user, the template, that is unique to the user and comprises information indicating the user's unique configuration of the page, is received from one of at least two locations and is flushable from a cache that is a location of the at least two locations due to infrequent usage by the user of the page having the at least one customized portion, the template is generated, before being cached, using the user's unique configuration of the page and a global template that is not unique to the user, the template, that is cached, is unique to the user, comprises information indicating the user's unique configuration of the page and is flushable from the cache;
   generating, by the at least one server computing device, the at least one customized portion of the page comprising the user's at least one customization using the template's information indicating the user's unique configuration of the page; and providing, by the at least one server computing device and to the user, the customized portion of the page having been generated using the template comprising information indicating the user's unique configuration of the page supplied by the user.

10. The method of claim 9, wherein the cached template is flushed from the location of the at least two locations due to infrequent usage by the user of the page having the at least one customized portion and the template is available from another location of the at least two locations.

11. The method of claim 10, the other location of the at least two locations comprising a front page generator that generates the template using the user configuration that is supplied by the user and that is unique to the user.

* * * * *